Nov. 28, 1967             P. L. FORIS            3,355,293
CONVERSION OF BENZO-INDOLINOSPIROPYRAN IMAGE TO FIXED RED IMAGE
Filed Feb. 26, 1964
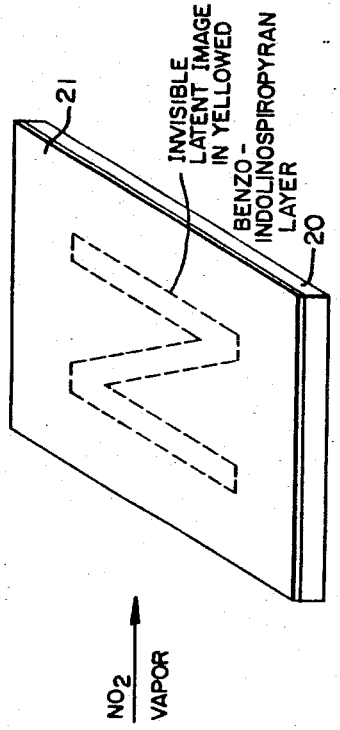
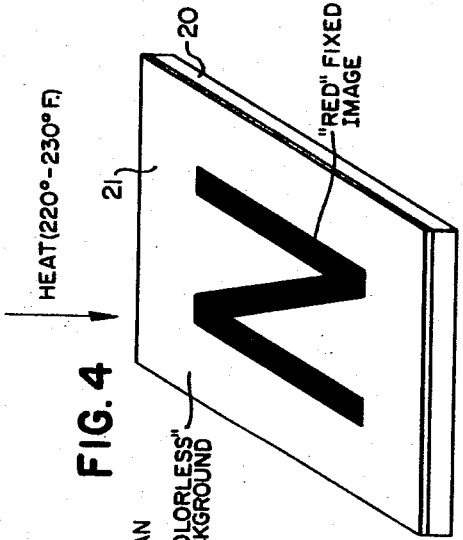
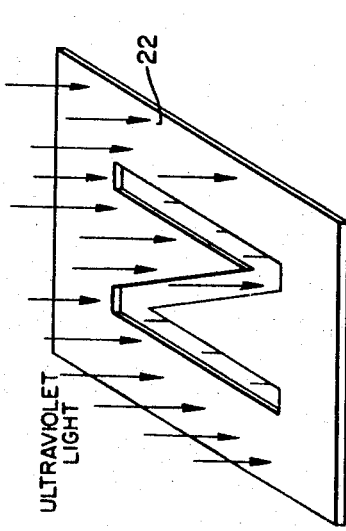
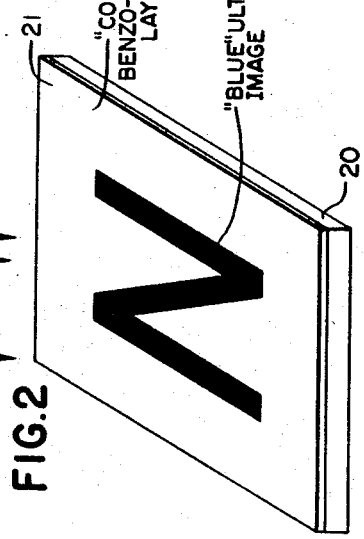
INVENTOR
PETER L. FORIS
HIS ATTORNEYS

United States Patent Office 3,355,293
Patented Nov. 28, 1967

3,355,293
CONVERSION OF BENZO-INDOLINOSPIROPYRAN IMAGE TO FIXED RED IMAGE
Peter L. Foris, Dayton, Ohio, assignor to The National Cash Register Company, Dayton, Ohio, a corporation of Maryland
Filed Feb. 26, 1964, Ser. No. 347,437
9 Claims. (Cl. 96—48)

ABSTRACT OF THE DISCLOSURE

A method is provided to make stable ultraviolet light photo-images in layers of benzo-indolinospiropyran molecules by treating the layers with $NO_2$ followed by a heating step.

This invention relates to thermally-stable ultraviolet-light-generated images, and more particularly pertains to fixing, against thermal fading, an image made by ultraviolet light in a thin layer comprising benzo-indolinospiropyran molecules. In this invention, the photochromc material is used in the colored state not for its hue, but for its chemical state. The image portion of the layer so made by ultraviolet light first is converted by an intermediate step to a yellow, thermally-fixed—but chemically reversible—state, and then, by a final step, the yellow molecules of the image portion of the layer are converted to a distinctive red-colored compound which is thermally stable and chemically irreversible, the background of the layer being fixed at the same time, so that it no longer is sensitive to ultraviolet light.

The invention will be described with respect to the making of such an image on a layer on a transparent support web, such as glass, but the invention is not to be deemed limited to glass or a transparent support web, as the layer—that is to say, a layer made entirely of benzo-indolinospiropyran molecules, or layers which consist of such molecules profusely dispersed in a binder material such as a polymeric film material—may be used as a self-supporting layer or a supported layer.

By a "photochromic image" is meant one in which the photochromic molecules are caused to change from a "colorless" normal state to a "colored" state of distinctive hue by reversible internal reorganization of the molecular structure, such molecules always tending to revert to the normal "colorless" form in response to the energy supplied by the ambient heat—the higher the temperature, the faster the reversion. Some molecules revert to the normal form, at a given temperature, more quickly than do others, and it has been an important objective of those conversant with the photochromic-image-forming art to stabilize the "colored" form of these materials against the ever-present thermal decay tendency at room-temperature environment. This object heretofore has been attained to a considerable degree by substituting stabilizing substituent groups on otherwise quickly-reverting photochromic molecules, for the purpose of slowing down the reversion rate, but such is not permanent, and applied heat is effective to overcome the built-in improvement.

The molecular rearrangement of a benzo-indolinospiropyran molecule in response to being struck by ultraviolet light is accompanied by a change in the light absorption characteristics of it, and such is evidenced in a great many compounds by a reflectance or transmission of incident light in a particular part of the visible part of the spectrum. In order to change its molecular configuration, a particular molecule must be free to become distorted in structure, and the distortion of the molecule cannot take place easily in a crystalline form of the substance, due to the packing of the molecule in the confined crystal arrangement. Therefore, only the surface molecules of a crystal have the necessary freedom to become affected with ordinary amounts of ultraviolet energy, and they are in such small minority as regards the quantity of molecules available in an observed area that they do not make an effective impression on the human eye. Because of this necessity for freedom of substantially all of the individual molecules in an image layer, the molecules have been used either in amorphous film form or in a liquid solution form, or, preferably, in a solid polymeric material film solution form, none of which forms inhibits the twisting and contorting of the individual molecules. The difficulty with these free-to-move molecules is that they, in addition to becoming affected more easily by ultraviolet light, also revert more easily to the original form.

Therefore, even with the light-sensitive molecules which evidence an en masse stability in the light-struck form in terms of minutes, hours, days, or months, such is not sufficient for permanent archival records, and this invention provides means for making such images permanent by a further treatment after they are formed with ultraviolet light.

Other means for stabilizing such photochromic images against thermal decay have been devised, one of such means being set forth in applicant's co-pending application for United States Letters Patent, Ser. No. 338,136, filed in the United States Patent Office on Jan. 16, 1964. That co-pending application discloses a means for stabilizing photochromic molecules through the formation of acid complexes therewith. These heat-stable complexes have a peculiar status in that they may be chemically reversed to be restored to the original heat-sensitive condition, and do not have, in the acid-complex form, the differential coloration necessary for good visibility of the image portion of the layer with respect to the background, as is necessary for a permanent archival record. In another co-pending United States patent application of applicant and William J. Becker, Ser. No. 342,492, filed Feb. 4, 1964, means is disclosed for converting a photochromic image to a stable metallic-silvered image, but such images are not transparent even though they are stable in the archival sense.

The present invention provides for the formation of highly and visibly colored, heat-stable, transparent, and irreversible images by the use of ultraviolet light on benzo-indolinospiropyran molecules in a layer in combination with further chemical treatment of the image-forming molecules, followed by a heating step.

Light-responsive materials desirable to use in this invention are benzo-indolinospiropyran and its derivatives, many of which derivatives were first made by Elliot Berman and disclosed as to their identity and as to the method of making them in his United States Letters Patent No. 3,100,778, which issued Aug. 13, 1963. A choice will be made from among these compounds for illustrating the procedural steps of the process of this invention, although the invention is not limited to the specifically named ones of the group.

Other derivatives of benzo-indolinospiropyran that are not stable in the "colored" form at room temperature, and the parent compound itself, which is not photochromic, are useful for the practice of this invention if they or the layers made of them are treated to form a yellow halogen acid complex before being subjected to the image-forming ultraviolet light, the so-subjected molecules becoming darker yellow and turning to the strong red hue when treated with $NO_2$ and heated to between 220 and 230 degrees Fahrenheit.

The particular steps following the formation of the ultraviolet-light-induced images that are involved in this invention, if room-temperature-stable compounds are used, include a treatment of the colored image with $NO_2$ vapor, followed by the step of heating the image-bearing layer to about 230 degrees Fahrenheit. The images formed by ultraviolet light, in the substituted compounds noted in the Berman patent, generally are of a dark blue hue when first formed. By this invention, the treatment of the images, first chemically by $NO_2$ vapor and then by heat, results in images in a red irreversibly stabilized state.

The invention is described with reference to diagrammatic drawing which shows, in a flow-sequence, the steps of the process as carried out by means of a stencil type of light mask for controlling the application of ultraviolet light to a layer provided with benzo-indolinospiropyran type of molecules to cause formation of the photochromic image. The image so formed is treated by $NO_2$, the $NO_2$-converted form being thereafter subjected to high temperature. It will be understood that the process is in no way limited to the stencil type of ultraviolet light control, as a controlled-beam source of ultraviolet light, or a photographic transparency mask, for controlling a beam or cone of such light, can be used to differentially impress the image on the sensitized layer. The $NO_2$ gas treatment may be carried on in any manner which is within the common knowledge of the chemist, as by subjecting the layers to the vapor within a space enclosure. The heating may be carried out in any manner desired, as in an oven or on a hot plate, to convert the chemically-treated image to the stabilized red form.

The drawing shows, in FIG. 2, an inert support plate 20, such as glass, having on it a layer of material 21, which comprises or consists of benzo-indolinospiropyran molecules, which layer has had an image of the letter "N" made on it in blue color by the passage of ultraviolet light through the cut-out of the stencil 22 of FIG. 1. The layer 21 then is exposed to $NO_2$ gas to form the yellow intermediate complex with the exposed molecules, the image having lost its color but remaining invisible in the all-over yellowing of the layer as seen in FIG. 3. The heating step produces the red image of FIG. 4.

An amorphous layer of benzo-indolinospiropyran molecules may be laid down from a liquid solution of them in a volatile solvent, the creation of an amorphous deposit being aided by the presence of slight quantities of impurities in the compound or by use of a combination of two types of the same kind of molecules of closely-allied molecular configuration. The formation of amorphous layers from solutions of impure or closely-allied substances, each of which crystallizes in the pure form, is well known to chemists, and various combinations of impurities or closely-allied materials may be used to insure the presence of the necessary amounts of the molecules in the layer in an amorphous form rather than in crystalline form.

If it is desired to have the light-sensitive layer in solid solution form, it is preferable that a transparent polymeric film-forming material be used—one which has no chemical reaction with the light-sensitive molecules other than to be a solvent therefor. Many materials are available on the market for forming such films, and, in the examples, particular ones will be identified for the purposes of explaining the steps by which the process is carried out.

Particularly, benzo-indolinospiropyran has the following structure, with ring positions noted:

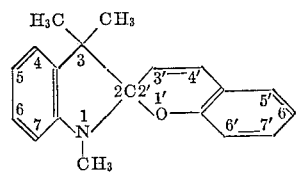

This compound may be substituted in the 5', 6', or 7' position in accordance with the list of substituents disclosed by Elliot Berman in the United States patent to which reference has been made, except that the 8' position must be H, but said Berman disclosure is not to be deemed to limit the extent to which the materials in general may be used in the process, as substitution may be made at the other numbered points as may be desired.

The invention will be described in relation to a preferred example and other examples showing how the processing steps may be carried out with different materials and the resulting different products produced thereby.

*Example I*

In this, the preferred example, a glass slide such as a microscope slide of approximately one thirty-second of an inch in thickness is coated with a solution of the 5-chloro-6'-nitro derivative form of the parent compound dissolved in benzene to a 10% concentration, and spun on an axis until the excess solution has been thrown off. The remaining thin layer of solution is allowed to dry to an amorphous state.

This amorphous layer of material then is subjected to ultraviolet light, which is rich in 3500-Angstrom wave lengths, for a fraction of a second to form the image through the medium of a stencil, as shown in the drawing. This image is a dark blue color and is subject to reversal, after a few hours' existence in the "colored" form at room temperature, to the "colorless" state. The change of the image to the "colorless" state occurs molecule by molecule, but the over-all effect is one of gradual decoloration.

While the image is still in its blue state, the slide is placed in a closed glass container and treated with $NO_2$ gas for two minutes, by which time the slide coating has turned to a pale yellow with no detectable image remaining therein—such image being latent, however.

Next, the slide is removed from the container and placed with the coated side up on a hot plate controlled to a temperature of 230 degrees Fahrenheit. In about a minute and a half, the latent image shows up red, and the background is colorless.

*Example II*

A solution is made in benzene with 10% content of the 6'$NO_2$ derivative of benzo-indolinospiropyran and a 10% content of polyphenylphenol-formaldehyde resin. This solution is coated on a glass slide of the type mentioned in Example I and allowed to dry to form a solid solution film of several thousandths of an inch in thickness.

After the film has been dried, the steps of the process are conducted as in Example I—namely, the image is formed on the film with the beforementioned ultraviolet light; the slide with the so-formed image is subjected to the $NO_2$ gas for several minutes; and finally the slide is heated to 220 degrees Fahrenheit for a minute or two.

*Example III*

In this form of the invention, the unsubstituted benzo-indolinospiropyran compound, for which the structure has been shown, is dissolved in a concentration of 10% in benzene, and an amorphous layer is formed from it on a glass slide according to the procedure of Examples I and II.

Inasmuch as the unsubstituted compound is not perceptibly affected by ultraviolet light, the molecules are converted to the HCl complex, by brief exposure to HCl fumes, which forms a yellow-colored complex. This yellow complex is sensitive to ultraviolet light and can be converted to the colored form therewith, a so-produced image showing up as a dark yellow area in the pale yellow background. This slide then is placed in the $NO_2$ gas atmosphere and thereafter heated to develop the red image, the HCl vapor being driven off from the background by the heat, to leave it colorless.

In these three examples, it has been shown that the procedural steps are (a) forming an ultraviolet-light-induced image in a thin layer of benzo-indolinospiropyran molecules, followed by (b) treating the so-produced image-bearing layer with NO₂ gas, followed by (c) heating of the NO₂-treated layer to 225 degrees Fahrenheit plus or minus 5 degrees Fahrenheit.

The so-formed image is stable against thermal disappearance and provides a translucent and colorful rendition of the image that can be used for its light-reflective or light-transmissive characteristics, with all of the overtones provided by variations and intensity afforded by the light-control means which has been used to form the image, such control being possible because the sensitive molecules are affected by the ultraviolet light one by one, and because the materials form no chain-multiplication of photo-effect, as in some forms of photo-processes.

While the temperature range of 220 degrees to 230 degrees Fahrenheit has been given as that at which the red color of the image is developed, it is obvious that no thermometer or other temperature indicator is needed, the test of the completion of the process being the appearance of the red image by reflected light.

The invention, while finding its most effective form in the treatment of images made by the parent compound benzo-indolinospiropyran and its derivatives of an ultraviolet-light-responsive nature, is not to be deemed limited to the preferred compounds, inasmuch as the conversion of the benzo-indolinospiropyran molecules to the complex with NO₂ gas and the conversion from the NO₂ complex to the heat-induced red condition thereafter is a feature of novelty that is not dependent upon the exact compounds used, as there are large numbers of them, and any detailed listing of them would merely obscure the novelty of the invention, which will be claimed as to a process and as to a product made according to the process.

What is claimed is:

1. The process for converting an image formed by ultraviolet light in a thin layer of molecules of a benzo-indolinospiropyran which consists of the steps of (a) subjecting the layer to NO₂ gas; and (b) subjecting the layer of (a) to heat sufficient to raise the temperature until the image becomes red in hue by reflected light.

2. A fixed image in a layer made according to the process of claim 1.

3. The process of claim 1 wherein the material is benzo-indolinospiropyran.

4. A layer image made according to the process of claim 3.

5. The process of making a fixed photochromic image which is resistant to thermal decay, including the steps of
   (a) forming a layer of molecules of a benzo-indolinospiropyran; (b) subjecting the layer (a) to ultraviolet light in a pattern to form a colored image; (c) subjecting the layer (b) bearing the colored image to NO₂ gas; and (d) heating the NO₂-treated layer to raise its temperature sufficiently to convert the image to a red hue by reflected light.

6. The product of the process of claim 5.

7. The process of forming archival-quality images, including the steps of
   (a) forming a thin layer of photochromically-sensitive benzo-indolinospiropyran material in the colorless state;
   (b) forming an image in the layer by projecting a pattern of ultraviolet light thereto;
   (c) treating the layer by exposure to NO₂ gas; and
   (d) heating the layer until the image appears in red color by reflected light.

8. The product produced by the process of claim 7.

9. The process of forming archival-quality images, including the steps of
   (a) forming a layer of photochromically-sensitive material of benzo-indolinospiropyran;
   (b) subjecting the layer of hydrohalic acid vapor to produce a yellow complex;
   (c) projecting a pattern of ultraviolet light onto layer (b) to form a dark yellow image;
   (d) subjecting the layer of (c) to NO₂ gas; and
   (e) heating the layer until a temperature is reached which turns the image-area to a red-reflecting condition.

References Cited

UNITED STATES PATENTS 3,212,898   10/1965   Cerreta _____ 96—90

NORMAN G. TORCHIN, *Primary Examiner.*

C. E. DAVIS, *Assistant Examiner.*